March 30, 1954  H. FRIEDMAN  2,673,934
RADIATION INTENSITY MEASURING DEVICE
Filed Dec. 27, 1951
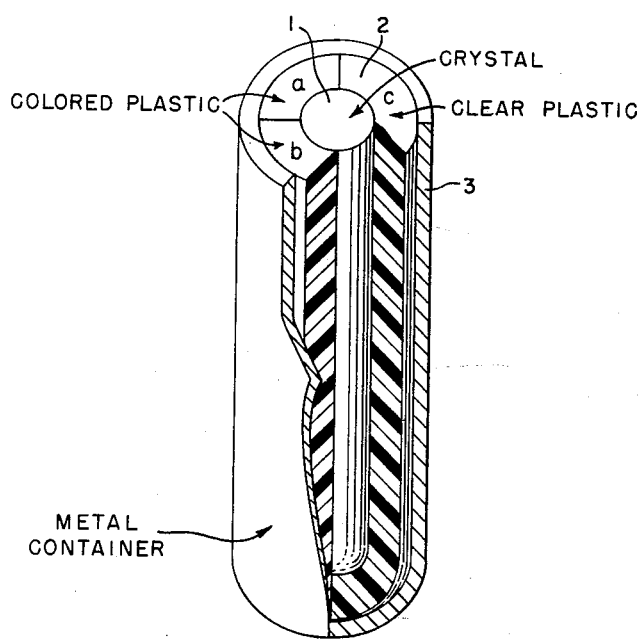
INVENTOR
HERBERT FRIEDMAN
BY
*Howard White* ATTORNEYS Patented Mar. 30, 1954

2,673,934

UNITED STATES PATENT OFFICE 2,673,934

RADIATION INTENSITY MEASURING DEVICE

Herbert Friedman, Arlington, Va., assignor to the United States of America as represented by the Secretary of the Navy Application December 27, 1951, Serial No. 263,680

5 Claims. (Cl. 250—83)

(Granted under Title 35, U. S. Code (1952), sec. 266)

This invention relates to a device for measuring the intensity of gamma radiation more especially from nuclear explosions.

It has become evident from the history of the diagnosis of victims of atom bombing that large scale treatment of casualties could be greatly facilitated if all personnel were provided with some means capable of recording the intensity of individual radiation exposures. Although the symptoms of radiation sickness per se are clear enough that victims may be broadly grouped according to exposure levels of 0–200, 200–400 and 400–600 roentgens, complications introduced by flash burns and blast damage make it impossible to diagnose gamma radiation damage apart from other injuries. It is imperative, therefore, if proper medical treatment is to be applied on a large scale, that some means be available which is capable of independently measuring the radiation dose received by the victims. Desirably such an instrument should be capable of measuring the radiation intensity in unit doses or steps of 50 or 100 roentgens, up to the level of about 600 roentgens.

It is an object of the present invention to provide a simple, inexpensive compact instrument for the unit measurement of the intensity of gamma radiation, more especially from nuclear explosions. It is a further object to provide a device of this kind which is small enough that it may easily be carried about by the individual as a personal dosimeter for recording and measuring gamma radiation to which he has been exposed.

Other objects of the invention will appear from the description thereof which follows.

According to my invention a device capable of detecting and providing unit measurement of the intensity of gamma radiation is constructed in the form of a colorimeter which comprises a sensitive element for recording the intensity of the radiation and a translucent color chart in close association therewith. The color chart is a translucent solid having a color corresponding to that developed in the sensitive element and gradations of the color in terms of a group of units of intensity of hard radiations, i. e., the roentgen. For protection against damage and to restrict the admission of light thereto, the assembly of sensitive element and associated color chart is provided with a light-impermeable jacket or casing, suitably made of metal, e. g., aluminum, steel or copper.

For a more complete understanding of the invention, reference is made to the single figure of the accompanying drawing in which is illustrated a preferred embodiment of my new radiation measuring device.

In the partly sectional figure of the drawing, 1 is the sensitive element in the form of a translucent solid capable of developing color therein on exposure to gamma radiation and 2 is a solid translucent color chart in juxtaposition with the sensitive element. A metal casing or jacket 3 serves to protect the assembly of sensitive element and color chart from damage and limits the entrance thereto of soft radiation such as light.

The sensitive element 1 on exposure to the gamma radiation registers the intensity of the received radiation in terms of the depth of the induced color. The translucent color chart 2 is graded in depth of the corresponding color in terms of roentgen units, for example, of 50, 100, 200, etc. Such gradations are shown at $a$, $b$ and $c$ on the color chart.

The device may be made up to quite small measurements so as to be easily worn by suitable attachment about the neck or arm or carried in the pocket as a personal dosimeter.

Assuming the condition that the wearer of the device has been exposed in an area of an atom bomb explosion, the intensity or unit dosage of the gamma radiation to which the victim has been exposed can be determined by viewing the color developed in the sensitive element 1 through the open end of the dosimeter and comparing the depth thereof with the color gradations, $a$, $b$ and $c$ etc., of the color chart 2.

The size of the sensitive element 1 is governed by the sensitivity required and the manner in which the color is to be viewed. The greater the thickness of the sensitive element through which transmitted light is viewed, the more readily can the color be detected. Any means which will increase the effective path length of the viewed light in the sensitive element may be applied thereto. Viewing the crystal or other sensitive element in such a way as to make use of multiple internal reflections will increase the depth of the developed color and facilitate reading and evaluation of the radiation dose. A simple means to this end is the application of an opaque coating, e. g., a matte or semi-matte white paint, on the surface of the side walls of the sensitive element.

The translucent solid constituting the radiation intensity detector of the new measuring device should retain its sensitivity for extended periods for at least several days, storage and desirably, also, should retain the radiation developed coloration with but negligible loss. A suitable source of substances in this respect are crystals of alkali metal halides which have been treated to produce therein a substantial proportion of U-centers. The color induced in alkali metal halide crystals varies with the particular alkali metal halide, for example sodium chloride (yellow), potassium chloride (violet) and potassium bromide (blue). Other substances which can be used as the sensitive element in the dosimeter are, for example, fused and crystalline quartz, and pure (100%) silica glasses such as Vycor glass from which all but the silica has been leached.

U-centers are associated with an absorption band in the ultra-violet and lie on the long wavelength side of the characteristic absorption band of the alkali metal halide. Hilsch and Pohl, Nachr. Ges. Wess. Gott, N. F. 2, 139 (1936) established that the U-band (so-called because origin unknown) was actually due to small amounts of alkali metal hydride in the crystal. U-centers can be introduced into alkali metal halides. One method of producing the U-centers in alkali metal halide crystals is as follows. The crystals are placed in a copper or Monel metal cylinder provided with a fairly close-fitting cover. The corresponding alkali metal is pressed in around the crystals on all sides so as to fill up the space in the container as much as possible. The packed container is then flushed with nitrogen and the cover screwed on and drawn down tight. This unit is then heated in a combustion furnace in an atmosphere of nitrogen at a temperature of about 1100° F. for about 8 hours. Care should be taken to avoid the presence of moisture due to the fire hazard involved with alkali metals. To recover any alkali metal vapor which has leaked from the container, it is advisable to pass the nitrogen exhaust from the furnace through a Dry Ice trap and also an oil trap. The cylinder is quenched in oil to room temperature and opened to the air. (Water should not be used for quenching because of the fire hazard.) Any excess alkali metal can be scraped from the treated crystals. Any F-centers (farbzentren) or color centers in the treated crystals are removed by heating the crystals in a Pyrex glass container provided with connections for flowing hydrogen over them while hot. This unit is heated in an oven at 1000° F. until the crystals are completely bleached, excess hydrogen being ignited at the exit to the unit.

The translucent color chart is suitably formed of a clear solid high softening point plastic, such as styrene, polyethylene or polymethylmethacrylate, which has been appropriately dyed.

While I have shown in a preferred embodiment of the invention a particular geometrical shape for the translucent sensitive element and the translucent color chart, it will be realized that the principle of the invention may be practiced using other geometrical patterns for these elements without departing from the spirit or scope of the invention.

The invention described herein may be manufactured and used by or for the Government of the United States of America for governmental purposes without the payment of any royalties thereon or therefor.

What is claimed is:

1. A device for measuring the intensity of hard radiation comprising in combination an elongated translucent crystal containing a substantial proportion of U-centers and capable of developing color therein on exposure to gamma radiation, an opaque, inwardly light-reflective coating on the side walls of said crystal, said coating being capable of yielding diffused reflections in said crystal, a solid translucent color chart in close proximity about said coating and crystal, and a light-impermeable casing containing said crystal, coating and color chart, said color chart and casing being conterminous with said crystal at one and the same end of said crystal.

2. A device for measuring the intensity of hard radiation comprising in combination an elongated translucent alkali metal halide crystal containing a substantial proportion of U-centers, an opaque, inwardly light-reflective coating on the side walls of said crystal, said coating being capable of yielding diffused reflections in said crystal, a solid translucent color chart in close proximity about said coating and crystal, and a light-impermeable casing containing said crystal, coating and color chart, said color chart and casing being conterminous with said crystal at one and the same end of said crystal.

3. A device as defined in claim 2, wherein the opaque, inwardly light-reflective coating on the side walls of the crystal is a matte to semi-matte white paint.

4. A device for measuring the intensity of hard radiation comprising in combination an elongated translucent alkali metal halide crystal containing a substantial proportion of U-centers, said crystal having a thickness of from about 2 to 5 mm. and a length of from about 5 to 10 mm., an opaque, inwardly light-reflective coating on the side walls of said crystal, said coating being capable of yielding diffused reflections in said crystal, a tubular translucent color chart in close proximity about said coating and crystal, a metal casing containing said crystal, coating and color chart, said color chart and metal casing each being open at one end and conterminous with said crystal at one and the same end of said crystal.

5. A device as defined in claim 4, wherein the opaque, light-reflective coating on the sidewalls of the crystal is a matte to semi-matte white paint.

HERBERT FRIEDMAN.

References Cited in the file of this patent

UNITED STATES PATENTS

| Number | Name | Date |
|---|---|---|
| 2,258,593 | Black | Oct. 14, 1941 |

FOREIGN PATENTS

| Number | Country | Date |
|---|---|---|
| 17,666 | Great Britain | Sept. 24, 1903 |

OTHER REFERENCES

AECD-2278 Photographic Neutron Dosimetry, by Gerhard Dessauer and Edwin Lennox, Sept. 14, 1948.